(12) United States Patent
Bizlewicz

(10) Patent No.: US 7,424,930 B2
(45) Date of Patent: Sep. 16, 2008

(54) VIBRATORY ENERGY DISSIPATION AND ISOLATION WITH MAGNETICALLY BIASED ROLLING MEMBERS

(76) Inventor: F. Peter Bizlewicz, 1209 Pine Lakes Dr. West, Wayne, NJ (US) 07470

( * ) Notice: Subject to any disclaimer, the term of this patent is extended or adjusted under 35 U.S.C. 154(b) by 237 days.

(21) Appl. No.: 10/988,712

(22) Filed: Nov. 12, 2004

(65) Prior Publication Data

US 2005/0122070 A1    Jun. 9, 2005

Related U.S. Application Data

(62) Division of application No. 10/287,110, filed on Nov. 4, 2002, now Pat. No. 6,830,125.

(51) Int. Cl.
*F16F 7/00* (2006.01)

(52) U.S. Cl. ............... 181/207; 181/208; 181/209; 248/638; 248/639; 248/640; 248/677; 384/446; 384/496

(58) Field of Classification Search ............... 181/207, 181/208, 209; 248/638, 639, 640, 188, 677; 384/446, 496
See application file for complete search history.

(56) References Cited

U.S. PATENT DOCUMENTS

| | | | |
|---|---|---|---|
| 1,730,424 A * | 10/1929 | Harrison | 384/446 |
| 2,311,382 A * | 2/1943 | Hansen, Jr. | 310/90.5 |
| 3,923,352 A * | 12/1975 | Pentlicki | 384/446 |
| 4,314,623 A | 2/1982 | Kurokawa | |
| 5,056,280 A * | 10/1991 | Shustov | 52/167.5 |
| 5,390,621 A | 2/1995 | Hattori et al. | |
| 5,445,249 A | 8/1995 | Aida et al. | |
| 5,586,922 A | 12/1996 | Kobayashi et al. | |
| 5,743,206 A | 4/1998 | Hattori | |
| 5,804,776 A * | 9/1998 | Bizlewicz | 181/207 |
| 5,896,961 A | 4/1999 | Aida et al. | |
| 5,905,804 A | 5/1999 | Lee | |
| 5,942,735 A | 8/1999 | Liang | |
| 5,957,022 A | 9/1999 | Stumpf et al. | |
| 6,471,557 B1 | 10/2002 | Hattori | |
| 6,682,217 B1 * | 1/2004 | Joffe | 384/8 |
| 6,880,977 B2 * | 4/2005 | Seufert | 384/446 |

* cited by examiner

*Primary Examiner*—Lincoln Donovan
*Assistant Examiner*—Forrest Phillips
(74) *Attorney, Agent, or Firm*—Arthur Jacob

(57) ABSTRACT

A coupling device is interposed between an electronic or electro-acoustic component and a supporting structure for draining, transmitting and dissipating vibratory energy generated within the component, while isolating the component from vibratory energy emanating from the support structure, utilizing a ball rolling along a bearing surface in directions away from and toward an equilibrium position, with the ball biased toward the equilibrium position by magnetic attraction forces.

9 Claims, 8 Drawing Sheets

VIBRATORY ENERGY DISSIPATION AND ISOLATION WITH MAGNETICALLY BIASED ROLLING MEMBERS

This application is a division of application Ser. No. 10/287,110, filed Nov. 4, 2002, now U.S. Pat. No. 6,830,125.

The present invention relates generally to controlling oscillatory movement of a rolling member along a complementary bearing surface and pertains, more specifically, to the magnetic control of rolling displacements in devices which utilize oscillating rolling members in the dissipation and isolation of vibratory energy, especially in the improvement of the performance of electronic and electro-acoustical components, such as sound reproduction systems or video systems wherein unwanted vibratory energy is dissipated or isolated to reduce or eliminate a source of signal distortion.

In an earlier patent, U.S. Pat. No. 5,804,776, the substance of which is incorporated herein by reference thereto, devices placed between a component of a sound reproduction system and a support structure transmit and dissipate vibratory energy generated within the component while isolating the component from vibratory energy emanating from the support structure, utilizing a rolling member displaced through oscillatory movements along a bearing block to transmit vibratory energy from the component to the block for dissipation at a lower surface of the block, while isolating the component from vibratory energy emanating from the support structure.

The present invention incorporates a magnetic arrangement for controlling oscillatory movement of such rolling members in similar devices to gain improved performance. As such, the present invention attains several objects and advantages, some of which are summarized as follows: Effectively dissipates deleterious vibratory energy generated within equipment such as electronic and electro-acoustical equipment for enhanced performance of such equipment; attains increased ease in the construction, installation and placement of devices which utilize oscillatory rolling members in the dissipation and isolation of vibratory energy; enhances the drain of internally generated vibratory energy from components, such as electronic and electro-acoustical components, for dissipation to surrounding vibration absorbing structures; provides a simple and effective arrangement for reducing or eliminating the deleterious effects of internally generated vibratory energy in components, such as in electronic and electro-acoustical components; enables enhanced performance in sound and picture reproduction systems without requiring modifications in the electronic and electro-acoustical components of the systems; is compatible for use with a wide variety of currently available electronic and electro-acoustical equipment; provides a relatively simple construction capable of relatively economical manufacture and widespread use for effective and reliable performance throughout a long service life.

The above objects and advantages, as well as further objects and advantages, are attained by the present invention which may be described briefly as an improvement in a device in which a rolling member engages a bearing surface on a bearing block for rolling along the bearing surface in directions away from and toward an equilibrium position, the improvement comprising: a magnetically-attracted structure in one of the rolling member and the bearing block; and at least one magnet placed relative to the equilibrium position so as to bias the rolling member toward the equilibrium position by magnetic attraction between the magnet and the magnetically-attracted structure.

The invention further includes a coupling device for interposition between an electronic or electro-acoustic component and a supporting structure for the transmission and dissipation of vibratory energy generated within the component while isolating the component from vibratory energy emanating from the support structure, the coupling device comprising: a bearing block having an upper surface and a lower surface, the upper surface including a bearing surface; a spherical ball having a center and engaging the bearing surface for rolling along the bearing surface in directions away from and toward an equilibrium position wherein the center of the ball is aligned with the equilibrium position; a ring magnet having a center and located concentric with the center of the ball when the ball is at the equilibrium position; and at least one further magnet juxtaposed with the bearing surface and located relative to the equilibrium position so as to interact with the ring magnet to bias the rolling member toward the equilibrium position.

In addition, the invention includes a coupling device for interposition between an electronic or electro-acoustic component and a supporting structure for the transmission and dissipation of vibratory energy generated within the component while isolating the component from vibratory energy emanating from the support structure, the coupling device comprising: a bearing block having an upper surface and a lower surface, the upper surface including a bearing surface; a rolling member engaging the bearing surface for rolling along the bearing surface in directions away from and toward an equilibrium position, the rolling member being constructed of a magnetically-attracted material; and at least one magnet juxtaposed with the bearing surface and located relative to the equilibrium position so as to bias the rolling member toward the equilibrium position by magnetic attraction between the magnet and the rolling member.

Further, the invention includes a method for biasing a rolling member into an equilibrium position in a device wherein a rolling member engages a bearing surface on a bearing block for rolling along the bearing surface in opposite directions away from and toward the equilibrium position, the method comprising: including a magnetically-attracted structure in one of the rolling member and the bearing block; and placing at least one magnet relative to the equilibrium position so as to bias the rolling member toward the equilibrium position by magnetic attraction between the magnet and the magnetically-attracted structure.

The invention will be understood more fully, while still further objects and advantages will become apparent, in the following detailed description of preferred embodiments of the invention illustrated in the accompanying drawing, in which.

Figure 1:
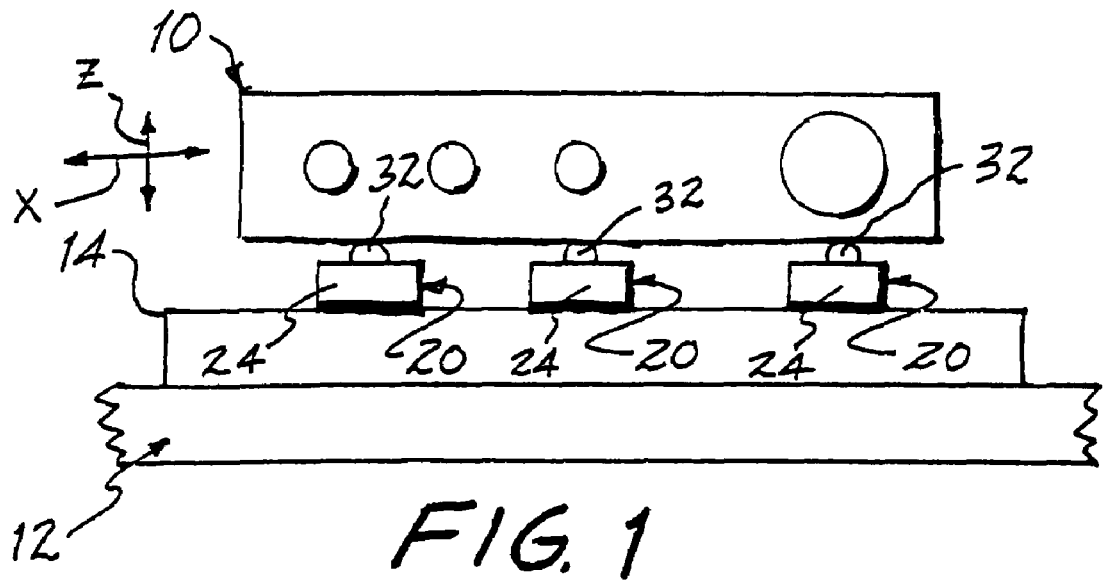
FIGS. 1 and 2 are diagrammatic views illustrating the use of devices constructed in accordance with the present invention.
Figure 2:
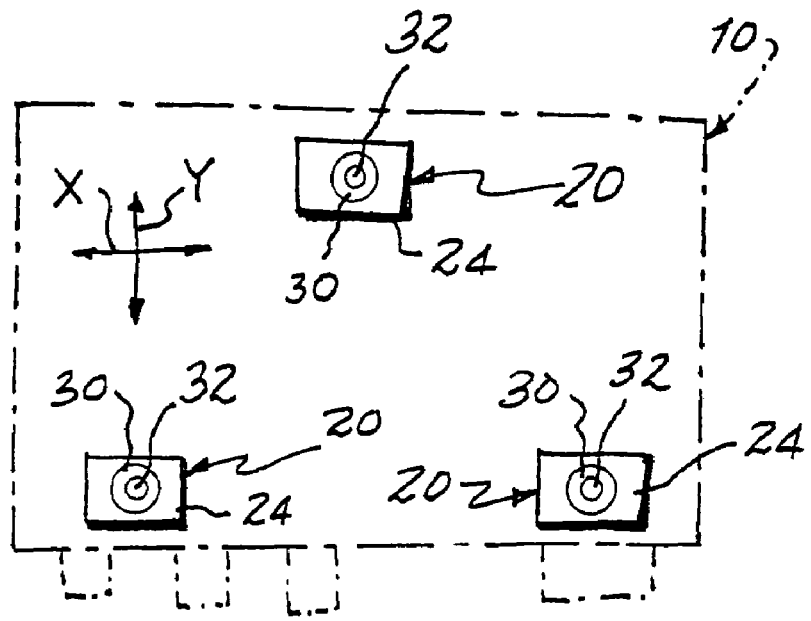
Figure 3:
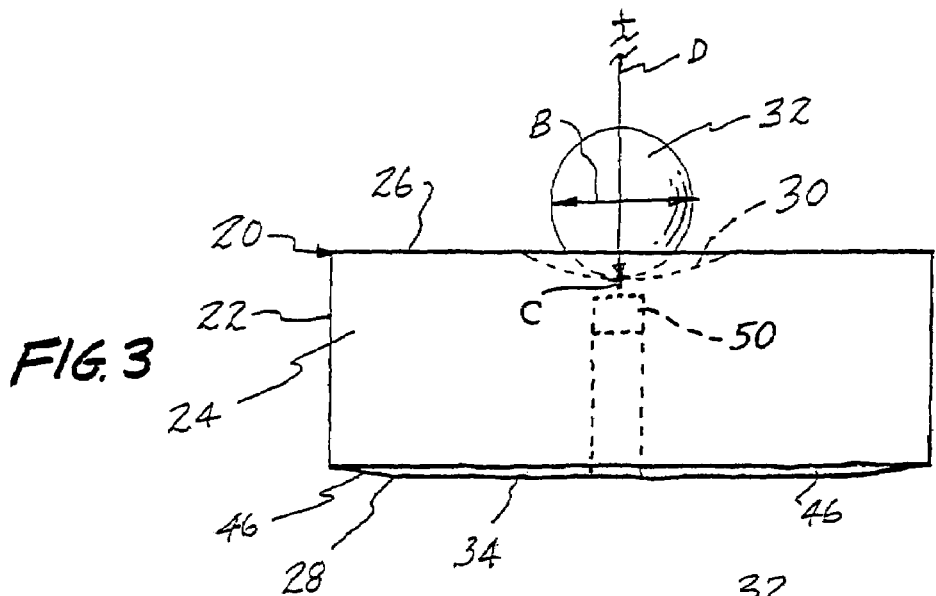
FIG. 3 is an enlarged front elevational view of a device constructed in accordance with the present invention.
Figure 4:
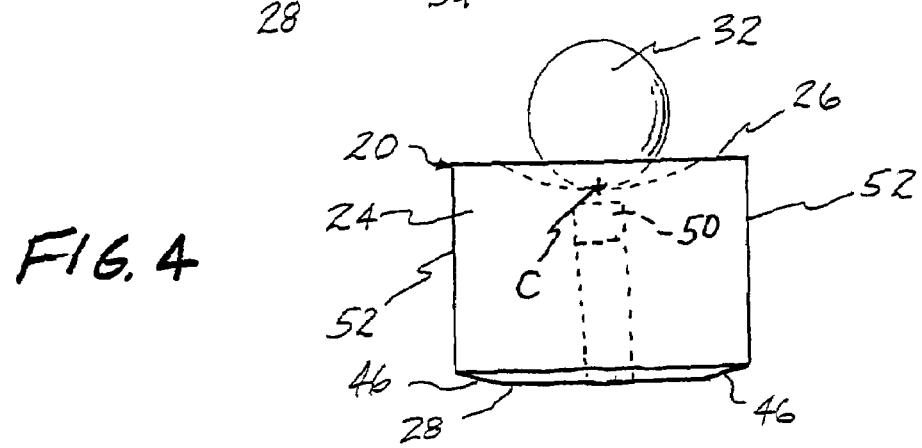
FIG. 4 is a side elevational view of the device of FIG. 3.
Figure 5:
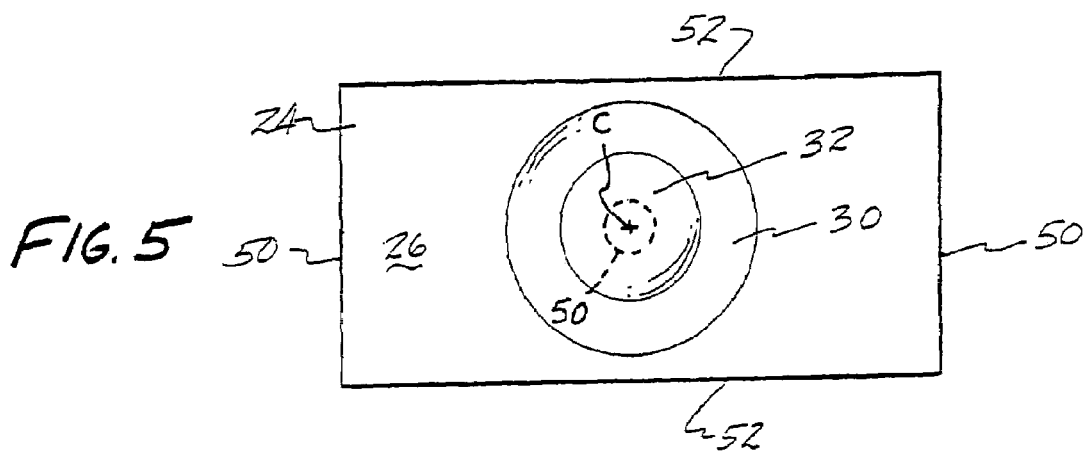
FIG. 5 is a top plan view of the device.
Figure 6:
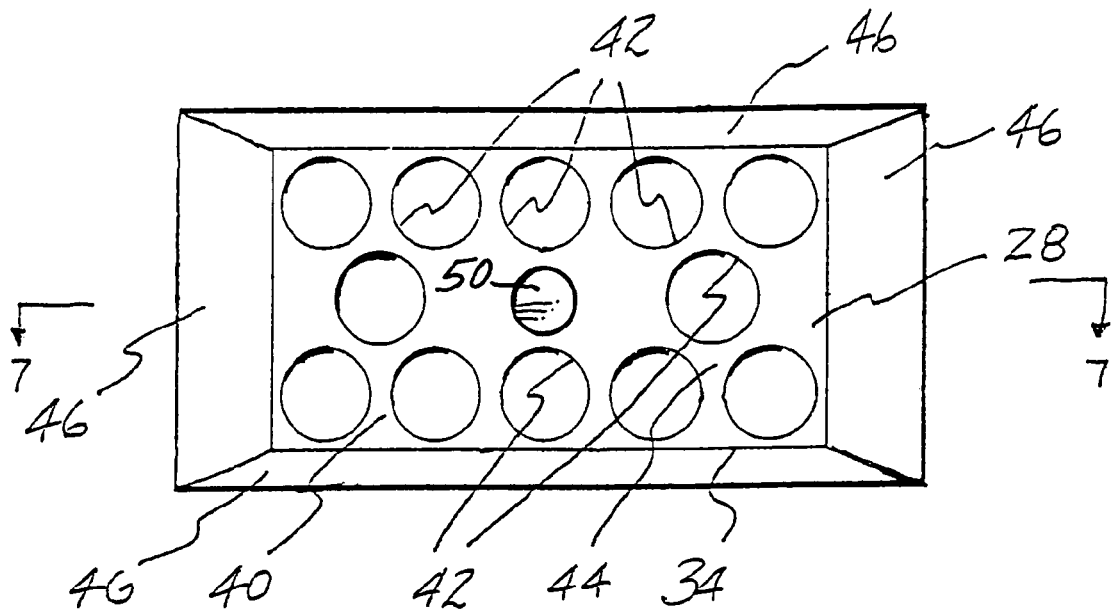
FIG. 6 is a bottom plan view of the device.
Figure 7:
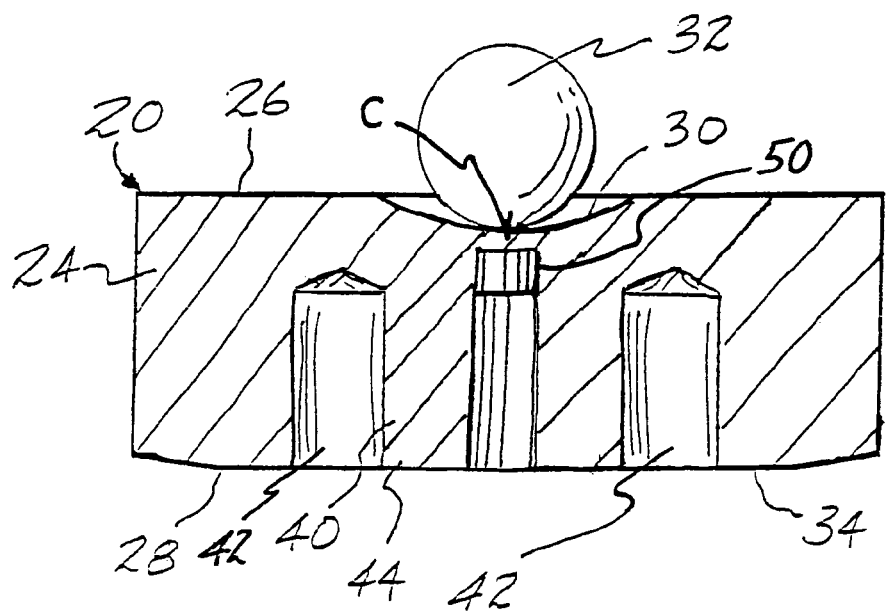
FIG. 7 is a cross-sectional view taken along line 7-7 of FIG. 6.

Referring now to the drawing, and especially to FIGS. 1 and 2 thereof, an electronic component of a sound reproduction system is shown diagrammatically in the form of an amplifier 10 supported upon a supporting structure which includes a support shelf 12. An energy absorption platform 14 is interposed between the amplifier 10 and the shelf 12 for absorbing vibrational energy emanating from the amplifier 10 in a now known manner. One such energy absorption platform 14 currently is available under the trademark SYMPOSIUM and has demonstrated the ability to enhance the performance of the amplifier 10 through exhibiting improved dynamic range and reduced intermodulation distortion in the sound reproduction system. In order to more effectively couple the amplifier 10 with the energy absorption platform 14 for draining and dissipating vibrational energy generated within the amplifier 10, three coupling devices constructed in accordance with the present invention are shown at 20, interposed between the amplifier 10 and the platform 14 and located at the apices of a triangle.

As best seen in FIGS. 3 through 7, as well as in FIGS. 1 and 2, each coupling device 20 has a base 22 which includes a block 24 having an upper surface 26 and a lower surface 28. A depression 30 in the upper surface 26 receives a rolling member shown in the form of a spherical ball 32 upon which the amplifier 10 is to rest, as seen in FIG. 1. The lower surface 28 includes a basal portion 34 which is to contact the platform 14, as seen in FIG. 1.

Depression 30 has a part-spherical surface contour configuration which includes a diameter D considerably larger than the diameter B of ball 32. Vibratory energy emanating from amplifier 10 and directed in altitudinal, or vertical directions, as illustrated by arrows Z in FIG. 1, is transmitted through ball 32 to block 24 to follow an altitudinal path to the platform 14 where the vibratory energy is dissipated. Vibratory energy emanating from amplifier 10 and directed in lateral, or horizontal directions, as illustrated by arrows X and Y in FIGS. 1 and 2, will tend to move the ball 32 along the depression 30, with a concomitant change in the altitude of the ball 32, thereby draining at least some of the laterally directed vibratory energy in an altitudinal direction into the platform 14. At the same time, the ball 32 and depression 30 arrangement tends to isolate amplifier 10 from any external vibratory energy which may emanate from the shelf 12. Ball 32 is biased toward an equilibrium position at the center C of depression 30, as illustrated in FIGS. 1 through 5 and 7, by gravity.

In order to increase the effectiveness of the conduct of the vibratory energy from the amplifier 10 through the block 24 to the platform 14, the block 24 is provided with a matrix 40, preferably established by plurality recesses shown in the form of bores 42 extending from the basal portion 34 of the lower surface 28 altitudinally upwardly into the block 24. The matrix 40 more effectively conducts the vibratory energy drained from amplifier 10 through the block 24 by optimizing the transmission path of the vibratory energy through the block 24 and more effectively couples the block 24 with the platform 14 for transmission of the vibratory energy from the block 24 to the platform 14. To that end, the configuration of the matrix 40 at the basal portion 34 of the lower surface 28 provides a contact area 44 along the basal portion 34 which is reduced in area as compared to the overall plan configuration of the block 24 and which is spread over the area of the lower surface 28. The area of the basal portion 34, and the contact area 44, is reduced further by the provision of bevelled portions 46, the bevelled portions 46 preferably extending completely around the perimeter of the basal portion 34 to surround the basal portion 34.

In order to increase the effectiveness of device 20, ball 32 is constructed of a material which is magnetically attracted, such as steel, and a magnet 50 is placed in block 24, so located relative to the equilibrium position of ball 32 as to further bias ball 32 toward the equilibrium position. That is, magnet 50 is juxtaposed with the depression 30, immediately below the center C of the depression 30, so that upon movement of the ball 32 away from the center C of the depression 30, the magnetic attraction between magnet 50 and ball 32 will bias the ball 32 back toward the equilibrium position. In this manner, the effectiveness of device 20 is increased. In addition, installation and handling of device 20 is greatly facilitated by assuring that the ball 32 of each device 20 is held in place on block 24, at the center C of depression 30, independent of gravitational forces while the devices 20 are being manipulated into appropriate locations prior to the placement of component 10 on the devices 20. Performance is maximized by assuring that all of the balls 32 in an installation of several devices 20 are located precisely at their respective equilibrium positions before a component is supported on the devices 20.

Figure 8:
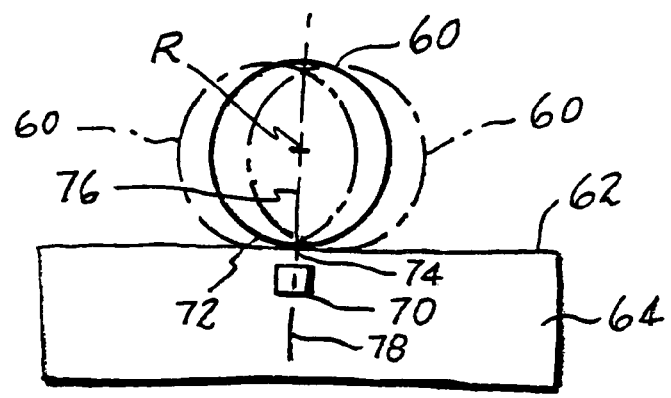
FIGS. 8 through 12 are diagrammatic illustrations of various combinations of elements in embodiments of the present invention.

Turning now to FIG. 8, a diagrammatic illustration shows how a rolling member, shown in the form of a spherical ball 60, engaged with a bearing surface 62 of a bearing block 64, is biased toward an equilibrium position by magnetic attraction. Thus, ball 60 includes a magnetically-attracted structure; that is, ball 60 is constructed of a material which is magnetically attracted as, for example, a ferrous material such as steel. The equilibrium position of ball 60 is shown in full lines, while rolling movements in directions away from the equilibrium position are illustrated in phantom (displacement shown is exaggerated for purposes of illustration). A magnet 70 is placed relative to the equilibrium position so as to bias the ball 60 toward the equilibrium position by magnetic attraction between the magnet 70 and the ball 60. As shown, the ball 60 includes an engagement surface 72 for engaging the bearing surface 62 of bearing block 64, and the engagement surface 72 has a center of rotation R. The engagement surface 72 engages the bearing surface 62 at an engagement location 74 on the engagement surface 72 when the ball 60 is at the equilibrium position, and an axis 76 extends between the center of rotation R and the engagement location 74. Magnet 70 is located on a line 78 coextensive with axis 76 when ball 60 is at the equilibrium position, line 78 representing the shortest distance between the center of rotation R and the location of magnet 70. Should ball 60 roll away from the equilibrium position, the biasing force of magnet 70 will tend to return engagement location 74 toward line 78, and ball 60 toward the equilibrium position.

Figure 9:
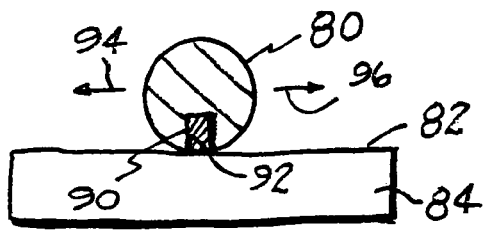

An alternate arrangement is illustrated in FIG. 9 wherein a rolling member in the form of a cylindrical roller 80 engages a bearing surface 82 of a bearing block 84. The bearing block 84 is constructed of a magnetically-attracted material, such as steel, and a bar magnet 90 is placed and affixed in a slot 92 extending along the length of the roller 80. The roller 80 is shown in an equilibrium position on the bearing block 84. Should roller 80 depart from the equilibrium position, such as in either of the opposite directions 94 and 96, the magnetic attraction between magnet 90 and bearing block 84 will bias the roller 80 back toward the equilibrium position.

Figure 10:
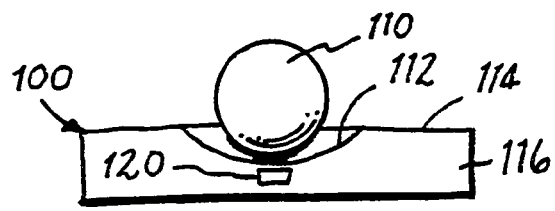

FIG. 10 is a diagrammatic illustration of a device 100 similar to device 20. A ball 110 is constructed of a magnetically-attracted material and is located in a part-spherical depression 112 in a bearing surface 114 of a bearing block 116. Ball 110 is biased toward the illustrated equilibrium position, at the center of the depression 112, by a magnet 120 placed in the bearing block 116 in juxtaposition with the equilibrium position, as well as by the force of gravity.

Figure 11:
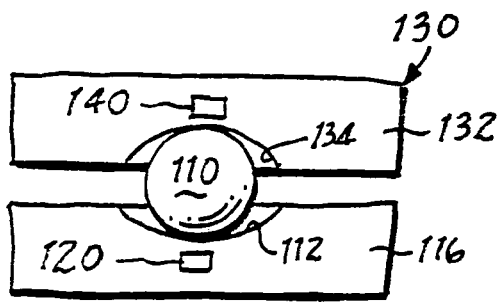

In device 130 of FIG. 11, the component parts of the embodiment described above in connection with FIG. 10, namely, the ball 110, bearing block 116 and magnet 120, are supplemented by a further bearing block 132. Bearing block 132 also has a part-spherical depression 134 and a further magnet 140 placed relative to the equilibrium position of ball 110, shown in full lines, so as to further bias the ball 110 toward the equilibrium position upon any departure of ball 110 from the equilibrium position.

Figure 12:
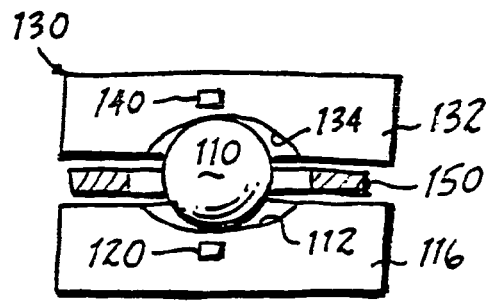
Figure 13:
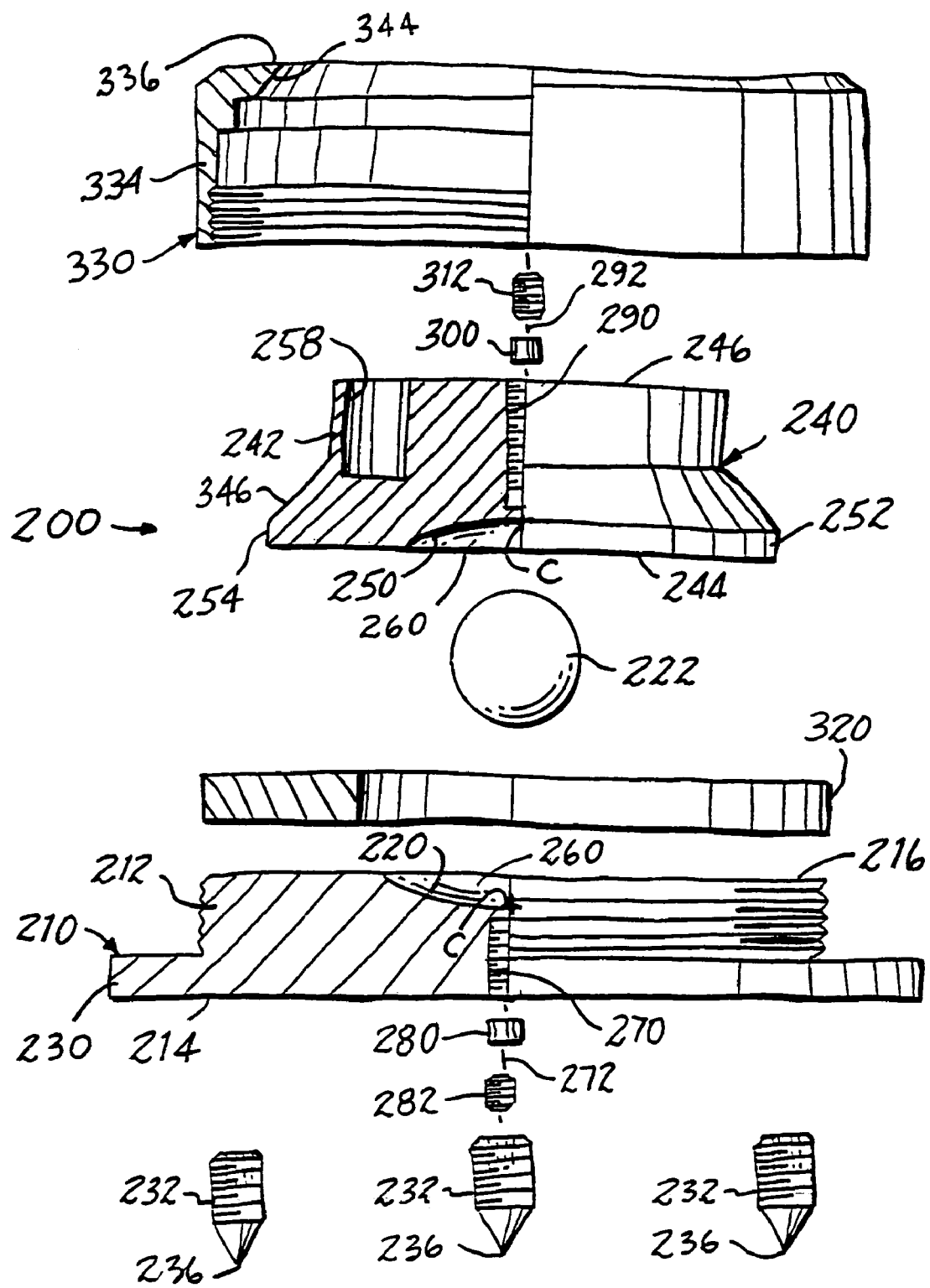
FIG. 13 is an exploded front elevational view, partially sectioned, of a device constructed in accordance with the present invention.
Figure 14:
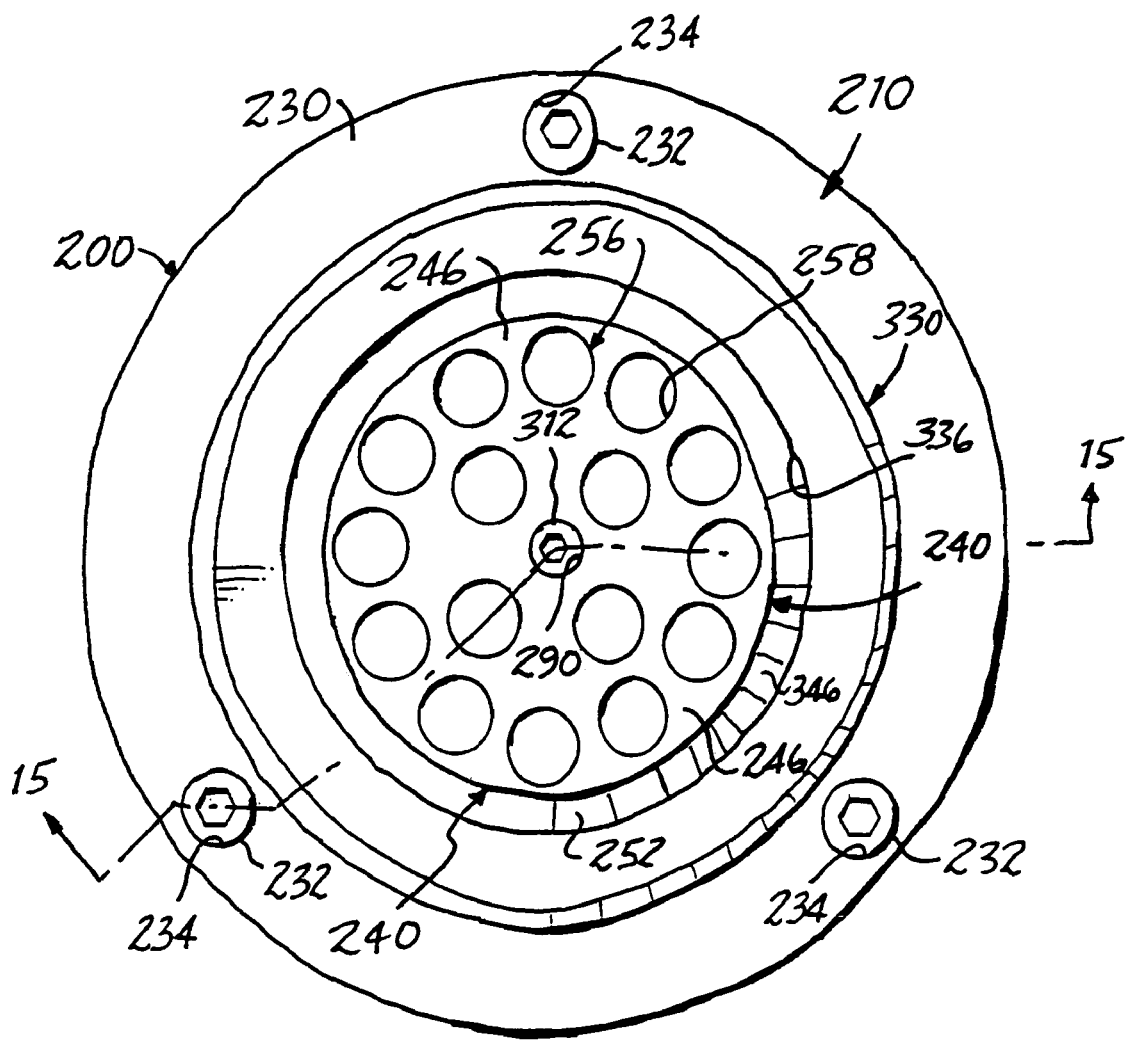
FIG. 14 is a top plan view of the device, assembled.
Figure 15:
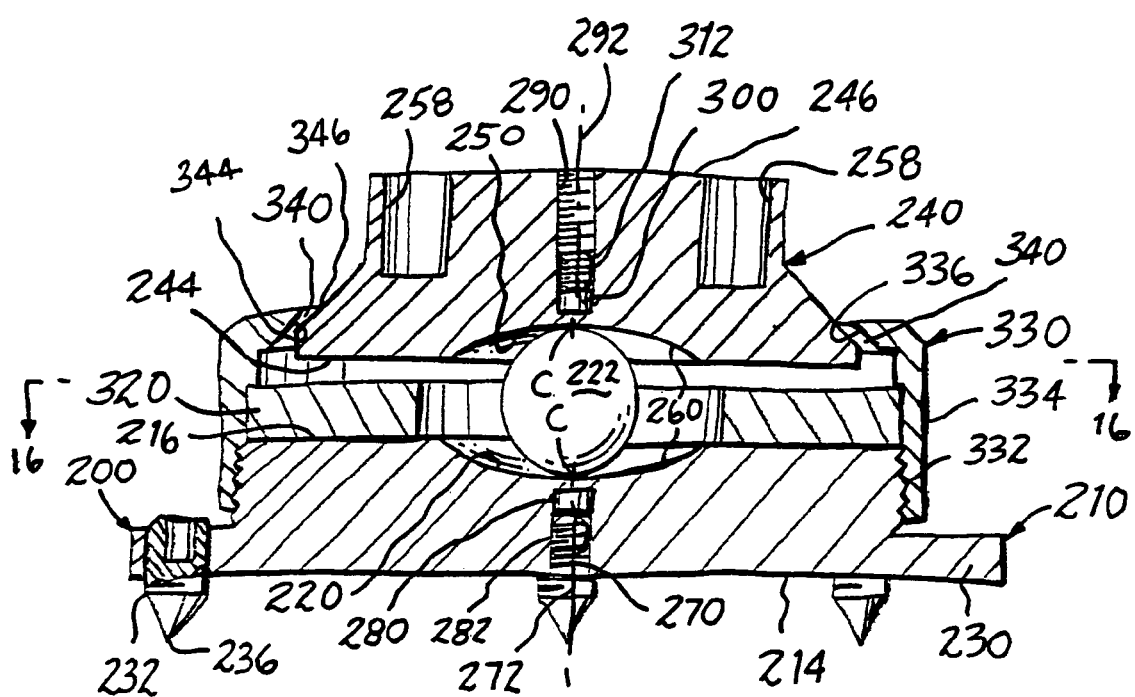
FIG. 15 is a cross-sectional view taken along line 15-15 of FIG. 14.
Figure 16:
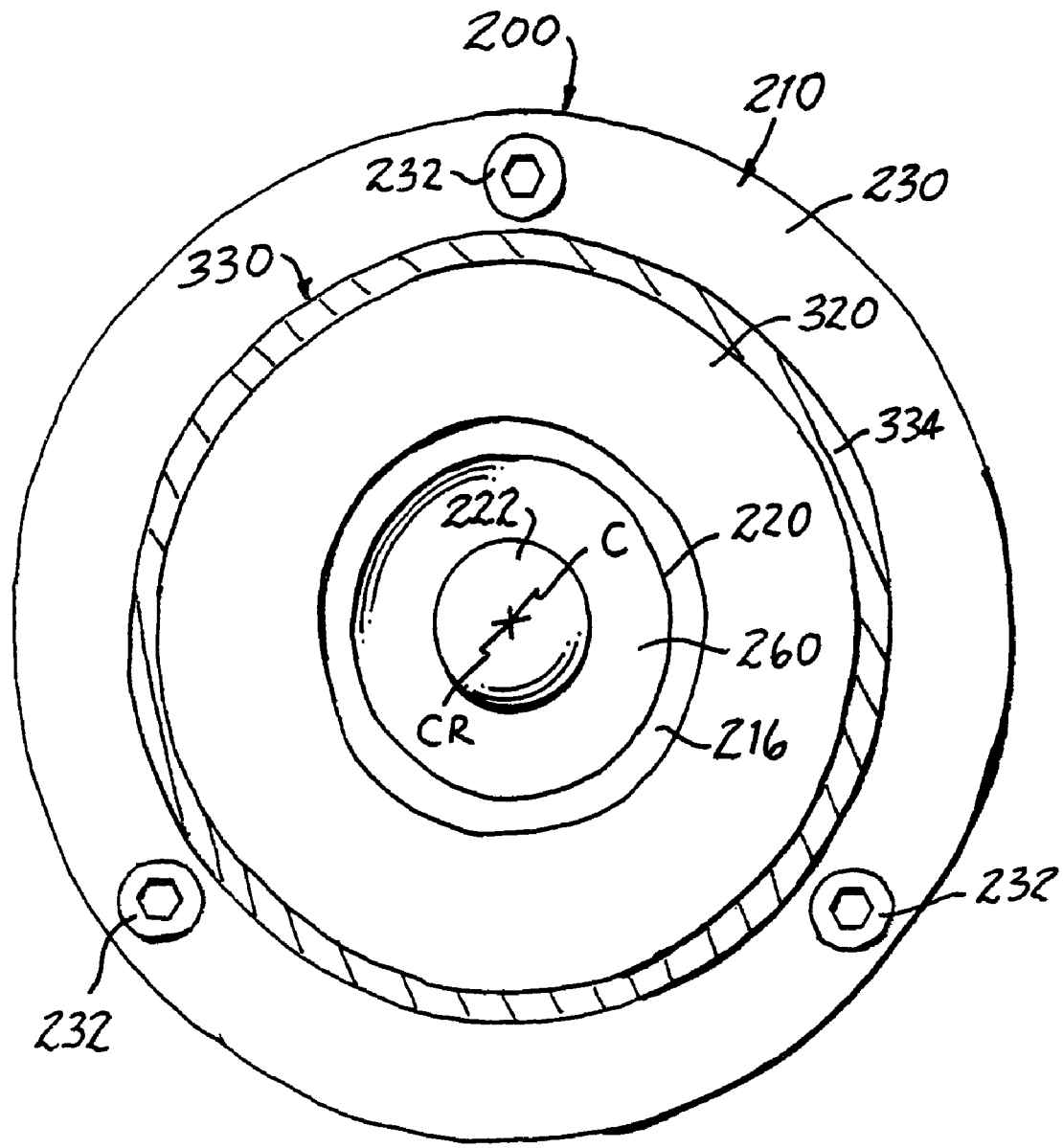
FIG. 16 is a cross-sectional view taken along line 16-16 of FIG. 15.

In the embodiment of FIG. 12, the component parts of device 130, as described in connection with FIG. 11, are supplemented by a ring magnet 150 located concentric with the center of each part-spherical depression 112 and 134. Ring magnet 150 interacts with either one or both of magnets 120 and 140 to supply an additional biasing force tending to return the blocks 116 and 132 and, consequently, ball 110 to the equilibrium position illustrated in full lines.

Turning now to FIGS. 13 through 16, another coupling device constructed in accordance with the present invention is shown at 200 and is seen to include a base 210 having a generally cylindrical first bearing block 212 extending upwardly from a basal surface, shown as a lower surface 214, to a bearing surface, illustrated as upper surface 216. Upper surface 216 includes a depression 220 located centrally within upper surface 216 for receiving a rolling member in the form of a spherical ball 222. A basal flange 230 is unitary with the base 210 and extends radially outwardly from the bearing block 212. Three feet 232 are threadably engaged in corresponding threaded apertures 234 spaced equidistant from one another around the flange 230 and include conically pointed ends 236 for supporting base 210 upon a support structure. Each foot 232 is independently adjustable within a corresponding aperture 234 so as to enable leveling of the base 210 on the support structure.

An upper member 240 has a generally cylindrical second bearing block 242 extending upwardly from a bearing surface, shown as a lower surface 244, to a coupling surface, shown as an upper surface 246, upon which an item to be supported is rested on the device 200. A depression 250 is located centrally within the lower surface 244 for receiving ball 222. A perimetric rim 252 is unitary with bearing block 242, adjacent the lower surface 244, and extends radially outwardly to an outer peripheral edge 254. A matrix 256 of recesses 258 which communicate with upper surface 246 is provided for purposes explained above in connection with device 20.

Each depression 220 and 250 has a part-spherical surface 260 with a contour configuration which includes a diameter considerably larger than the diameter of ball 222, and a center C. Ball 222 is illustrated at an equilibrium position where the ball 222 contacts each depression 220 and 250 at the center C of a corresponding part-spherical surface 260. Vibratory energy in altitudinal and lateral directions is treated in a manner similar to that described above in connection with device 20. Thus, upper and lower bearing blocks 242 and 212 will move relative to one another in lateral directions and in altitudinal directions as ball 222 is displaced from the equilibrium position, and ball 222 will be biased back toward the equilibrium position by gravitational forces.

A magnetic arrangement is provided for supplying additional forces biasing the ball 222 toward the equilibrium position. To this end, ball 222 is constructed of a magnetically-attracted material, such as steel, and magnets are located relative to the equilibrium position to establish magnetic forces which bias the ball 222 toward the equilibrium position. Thus, base 210 includes a threaded hole 270 aligned with the equilibrium position of ball 222 and extending from the lower surface 214 toward the upper surface 216, and terminating just short of upper surface 216, along a line 272 normal to the part-spherical surface 260 of depression 220, at center C of part-spherical surface 260. A disc magnet 280 of permanent magnetic material, such as neodymium alloy, is placed in hole 270 and is retained in the hole 270, juxtaposed with the center C and with ball 222, by a threaded plug 282. Likewise, the upper member 240 includes a threaded hole 290 aligned with the equilibrium position of ball 222 and extending from the upper surface 246 toward the lower surface 244, and terminating just short of lower surface 244, along a line 292 normal to the part-spherical surface 260 of depression 250, at center C of part-spherical surface 260. A disc magnet 300 is placed in hole 290 and is retained in the hole 290, juxtaposed with the corresponding center C and with ball 222, by a threaded plug 312. Upon movement of ball 222 away from the equilibrium position, magnetic attraction between each magnet 280 and 300 and ball 222 will bias the ball 222 as well as the bearing blocks 212 and 242 back toward the equilibrium position.

In order to provide further biasing of the bearing blocks 212 and 242, as well as the ball 222, toward the equilibrium position, a ring magnet 320 of a permanent magnetic material, such as a ceramic magnetic material, is placed on the upper surface 216 of bearing block 212 and is located so that the center CR of the ring magnet 320 is concentric with center C of each part-spherical surface 260. Magnetic interaction between ring magnet 320 and either one or both of magnets 280 ad 300 will supply further magnetic forces for biasing the bearing blocks 212 and 242, as well as the ball 222, back toward the equilibrium position.

The magnetic biasing of the relatively movable component parts of device 200, namely, the base 210, the upper member 240 and the ball 222, enhances the performance of the device 200 through better and more accurate biasing of the parts toward the equilibrium position, while providing damping of such movements away from the equilibrium position. In addition, assembly, handling and installation of devices 200 is facilitated in that the assembled, relatively movable component parts are held together and accurately located relative to one another by magnetic attraction, enabling handling and placement of each device 200 as a complete unit, independent of gravitational forces.

As an added measure to maintain the assembly of the relatively movable component parts, a restrainer is provided in the form of a restraining ring 330 threaded onto base 210 at 332. Ring 330 includes an axial skirt 334 and a radial lip 336 spaced from and overlapping the perimetric rim 252 of upper member 240 to establish a space 340 between the restraining ring 330 and perimetric rim 252 of the upper member 240. Restraining ring 330 confines the upper member 240 to the assembled relationship among the relatively movable component parts, while limiting movement of the upper member 240 to displacement within the space 340 for appropriate operation of device 200. The limited movement preferably is within a range of movement which assures that ball 222 is confined to engagement with depressions 220 and 250 during relative movement between upper and lower bearing blocks 242 and 212. In the preferred construction, complementary frusto-conical surfaces 344 and 346 on the lip 336 of the restraining ring 330 and on the rim 252, respectively, facilitate assembly of device 200, as well as enhance performance.

It will be seen that the present invention attains the objects and advantages summarized above, namely: Effectively dissipates deleterious vibratory energy generated within equipment such as electronic and electro-acoustical equipment for enhanced performance of such equipment; attains increased ease in the construction, installation and placement of devices which utilize oscillatory rolling members in the dissipation and isolation of vibratory energy; enhances the drain of internally generated vibratory energy from components, such as electronic and electro-acoustical components, for dissipation to surrounding vibration absorbing structures; provides a simple and effective arrangement for reducing or eliminating the deleterious effects of internally generated vibratory energy in components, such as in electronic and electro-acoustical components; enables enhanced performance in sound and picture reproduction systems without requiring modifications in the electronic and electro-acoustical components of the systems; is compatible for use with a wide variety of currently available electronic and electro-acoustical equipment; provides a relatively simple construction capable of relatively economical manufacture and widespread use for effective and reliable performance throughout a long service life.

It is to be understood that the above detailed description of preferred embodiments of the invention is provided by way of example only. Various details of design, construction and procedure may be modified without departing from the true spirit and scope of the invention, as set forth in the appended claims.

The invention claimed is:

1. An improvement in a device in which oscillatory movement of a rolling member along a bearing surface on a bearing block in directions away from and toward an equilibrium position dissipates vibratory energy applied to the device, the improvement comprising:
   a magnetically-attracted structure in one of the rolling member and the bearing block; and
   at least one magnet located relative to the magnetically-attracted structure and placed relative to the equilibrium position at a location which enables oscillatory movement of the rolling member by rolling of the rolling member along the bearing surface in the directions away from and toward the equilibrium position, while biasing the rolling member toward the equilibrium position to damp the oscillatory movement by magnetic attraction between the magnet and the magnetically-attracted structure and thereby enhance dissipation of vibratory energy applied to the devices;
   the rolling member including an engagement surface for engaging the bearing surface, the engagement surface having a center of rotation, an engagement location for engaging the bearing surface when the rolling member is in the equilibrium position, and an axis extending between the center of rotation and the engagement location; and
   the magnet being located on a line aligned coextensive with the axis when the rolling member is in the equilibrium position such that upon oscillatory movement of the rolling member away from the equilibrium position, the axis will depart from the line and the magnet will bias the axis toward alignment coextensive with the line.

2. The improvement of claim 1 wherein the rolling member comprises a ball having a given diameter.

3. The improvement of claim 2 wherein the ball is constructed of a magnetically-attracted material and the magnet is juxtaposed with the bearing block.

4. The improvement of claim 3 wherein the bearing surface includes a depression having a part-spherical surface having a diameter greater than the given diameter, the part-spherical surface has a center located at the equilibrium position, the ball comprises a spherical ball placed in the depression, and the magnet is juxtaposed with the center of the part-spherical surface.

5. A method for biasing a rolling member into an equilibrium position in a device wherein oscillatory movement of a rolling member along a bearing surface on a bearing block in opposite directions away from and toward the equilibrium position, the method comprising:
   including a magnetically-attracted structure in one of the rolling member and the bearing block, the rolling member including an engagement surface for engaging the bearing surface, the engagement surface having a center of rotation, an engagement location for engaging the bearing surface when the rolling member is in the equilibrium position, and an axis extending between the center of rotation and the engagement location; and
   placing at least one magnet relative to the magnetically-attracted structure and relative to the equilibrium position at a location which enables oscillatory movement of the rolling member by rolling of the rolling member along the bearing surface in the directions away from and toward the equilibrium position to damp the oscillatory movement, while biasing the rolling member toward the equilibrium position by magnetic attraction between the magnet and the magnetically-attracted structure and thereby enhance dissipation of vibratory energy applied to the device, the location of the magnet being on a line aligned coextensive with the axis when the rolling member is in the equilibrium position such that upon oscillatory movement of the rolling member away from the equilibrium position, the axis will depart from the line and the magnet will bias the axis toward alignment coextensive with the line.

6. The method of claim 5 wherein the rolling member comprises a ball having a given diameter and constructed of a magnetically-attracted material, the method including placing the magnet in the bearing block, juxtaposed with the equilibrium position.

7. The method of claim 6 wherein the bearing surface includes a depression having a part-spherical surface having a diameter greater than the given diameter, the part-spherical surface has a center located at the equilibrium position, and the ball comprises a spherical ball placed in the depression, the method including limiting relative movement between the bearing block and the further bearing block to movement within a range of movement wherein the ball remains within the depression.

8. The method of claim 6 wherein the bearing surface includes a depression having a part-spherical surface having a diameter greater than the given diameter, the part-spherical surface has a center located at the equilibrium position, and the ball comprises a spherical ball placed in the depression, the method including juxtaposing the magnet with the center of the part-spherical surface.

9. The method of claim 6 wherein the bearing surface includes a depression having a part-spherical surface having a diameter greater than the given diameter, the part-spherical surface has a center located at the equilibrium position, and the ball is placed in the depression, the method including locating a ring magnet concentric with the part-spherical surface.

* * * * *